(No Model.)
J. J. O'NEILL.
HARNESS SUPPORT.
No. 433,998. Patented Aug. 12, 1890.
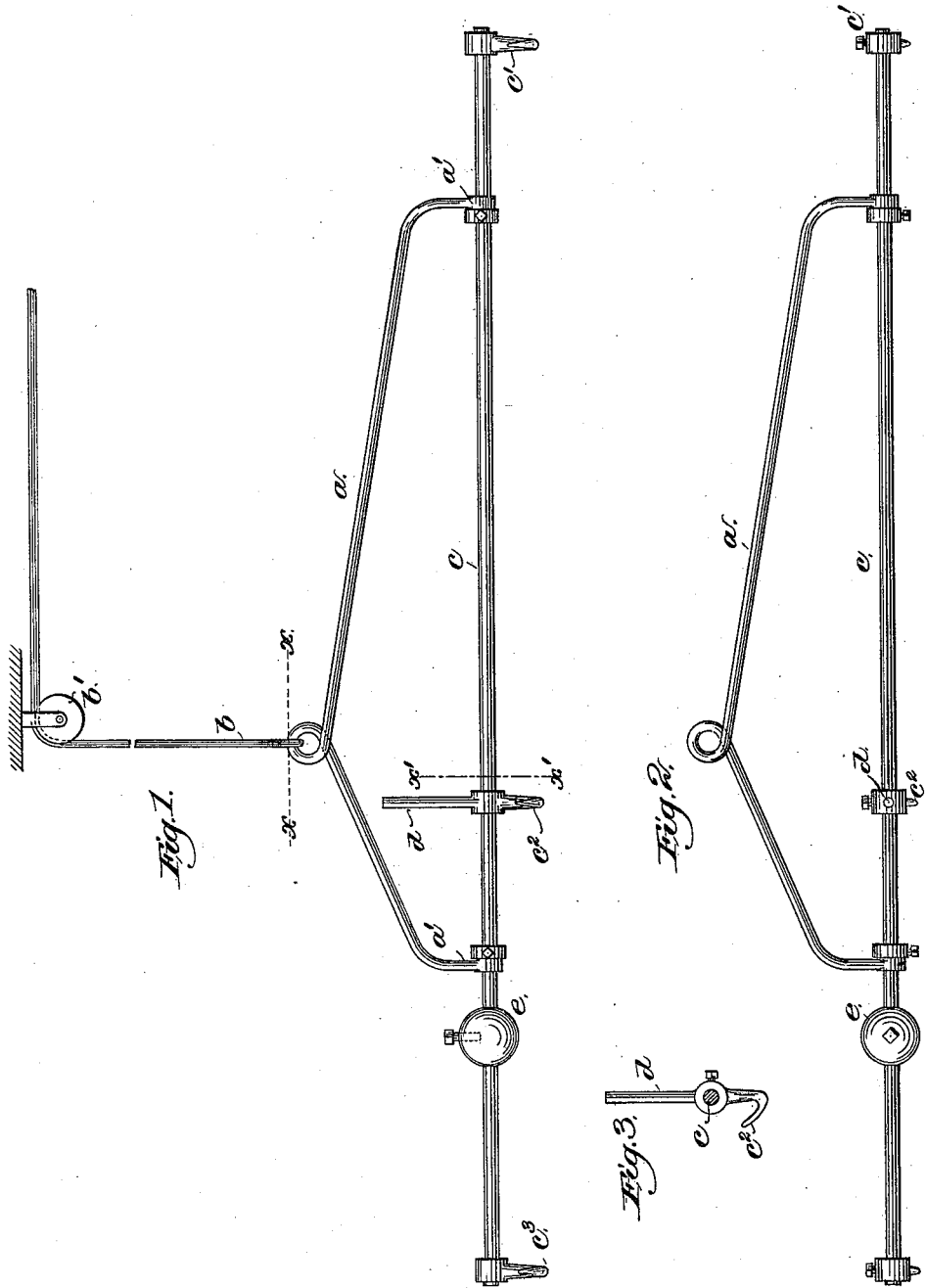
Witnesses.
Fred. L. Greenleaf
Frederick L. Emery
Inventor:
James J. O'Neill,
by Crosby & Gregory
attys.

UNITED STATES PATENT OFFICE.

JAMES J. O'NEILL, OF BOSTON, MASSACHUSETTS.

HARNESS-SUPPORT.

SPECIFICATION forming part of Letters Patent No. 433,998, dated August 12, 1890.

Application filed May 12, 1890. Serial No. 351,502. (No model.)

*To all whom it may concern:*

Be it known that I, JAMES J. O'NEILL, of Boston, county of Suffolk, State of Massachusetts, have invented an Improvement in Harness-Supports, of which the following description, in connection with the accompanying drawings, is a specification, like letters on the drawings representing like parts.

This invention has for its object to improve and simplify that class of harness-support employed in fire-engine and like houses to sustain the harness to be put instantly upon a horse.

My improved harness-support consists, essentially, of a rod supported on a hanging yoke, the said rod having a series of hooks on which to hang the different parts of the harness, and an arm which may be engaged when it is desired to turn the rod and drop the harness in place on the horse, the said rod having a suitable counter-balance to enable the rod to be poised substantially in horizontal position.

Figure 1 in side elevation represents a harness-support embodying my invention; Fig. 2, a similar view thereof with the rod $c$ turned; and Fig. 3, a section in the line $x'$, Fig. 1, looking toward the left.

The yoke $a$, suspended upon the rope $b$, extended over a pulley $b'$ on the ceiling in usual manner, has suitable bearings $a'$ near each end to receive the rod $c$, having, as shown, three hooks $c'$ $c^2$ $c^3$, upon which to hang the different parts of the harness to be supported above and dropped upon a horse brought under the same. The rod has an arm $d$, which for cheapness is shown as integral with the hook $c^2$, and the rod has also an adjustable counterbalancing-weight $e$, the latter serving to keep the frame and rod in the proper horizontal level.

In operation the user will hang the harness on the hooks $c'$ $c^2$ $c^3$, and the weight of the harness will put the hooks and arm $d$ in the position shown in the drawings, so that as soon as the rod is turned by or through the arm $d$, which may be of any usual shape, the rod will be turned to turn the hooks in a direction to retire from and drop the harness, the hooks by being heavier than the arm $d$ acting normally to turn the rod back into the position shown in Fig. 1.

I claim—

A harness-support consisting of the yoke $a$, a rod $c$ therein having hooks $c'$ $c^2$ $c^3$, an arm $d$, by which to turn the said rod to remove the hooks from a harness, and a counterbalancing-weight, all substantially as shown and described.

In testimony whereof I have signed my name to this specification in the presence of two subscribing witnesses.

JAMES J. O'NEILL.

Witnesses:
JAS. H. CHURCHILL,
EMMA J. BENNETT.